United States Patent
Koseki et al.

(10) Patent No.: US 9,589,734 B2
(45) Date of Patent: Mar. 7, 2017

(54) SOLID ELECTROLYTIC CAPACITOR AND MANUFACTURING METHOD THEREOF

(71) Applicant: NIPPON CHEMI-CON CORPORATION, Tokyo (JP)

(72) Inventors: Kazuya Koseki, Kawasaki (JP);
Kouichi Kuroda, Sukagawa (JP);
Junichi Kawakami, Kawasaki (JP);
Masao Sakakura, Sukagawa (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 14/418,178

(22) PCT Filed: Jul. 30, 2013

(86) PCT No.: PCT/JP2013/070631
§ 371 (c)(1),
(2) Date: Jan. 29, 2015

(87) PCT Pub. No.: WO2014/021333
PCT Pub. Date: Feb. 6, 2014

(65) Prior Publication Data
US 2015/0213962 A1    Jul. 30, 2015

(30) Foreign Application Priority Data
Jul. 31, 2012    (JP) ................. 2012-169629

(51) Int. Cl.
*H01G 9/028* (2006.01)
*H01G 9/00* (2006.01)
*H01G 9/032* (2006.01)
*H01G 9/15* (2006.01)
*H01G 9/022* (2006.01)
*H01G 9/035* (2006.01)

(52) U.S. Cl.
CPC .......... *H01G 9/028* (2013.01); *H01G 9/0036* (2013.01); *H01G 9/022* (2013.01); *H01G 9/032* (2013.01); *H01G 9/035* (2013.01); *H01G 9/151* (2013.01)

(58) Field of Classification Search
CPC ...... H01G 9/0036; H01G 9/032; H01G 9/151; H01G 9/022; H01G 9/035; H01G 9/028
See application file for complete search history.

(56) References Cited

U.S. PATENT DOCUMENTS

| | | | |
|---|---|---|---|
| 4,910,645 A | 3/1990 | Jonas et al. | |
| 6,307,735 B1 * | 10/2001 | Saito | H01G 9/025 361/512 |
| 7,497,879 B2 * | 3/2009 | Kakuma | H01G 9/022 257/E21.008 |
| 7,872,858 B2 * | 1/2011 | Kakuma | H01G 9/15 361/517 |
| 8,767,377 B2 * | 7/2014 | Aoyama | H01G 9/02 361/502 |
| 2004/0223270 A1 | 11/2004 | Nitta et al. | |
| 2008/0002334 A1 | 1/2008 | Kakuma et al. | |
| 2009/0144954 A1 | 6/2009 | Furusawa et al. | |

FOREIGN PATENT DOCUMENTS

| | | | |
|---|---|---|---|
| CN | 101106021 A | | 1/2008 |
| CN | 100533617 C | | 8/2009 |
| JP | 2-15611 A | | 1/1990 |
| JP | 11186110 A | * | 7/1999 |
| JP | 2001223136 A | * | 8/2001 |
| JP | 2004-303940 A | | 10/2004 |
| JP | 2008-10657 A | | 1/2008 |
| JP | 2008010657 A | * | 1/2008 |
| JP | 2008-66502 A | | 3/2008 |
| JP | 2010-171305 A | | 8/2010 |
| JP | 2011-249694 A | | 12/2011 |
| JP | 2012-124239 A | | 6/2012 |

OTHER PUBLICATIONS

Office Action issued Sep. 2, 2016, in Chinese Patent Application No. 201380037585.8.
Office Action issued Aug. 15, 2016 in Taiwanese Patent Application No. 102127424.

* cited by examiner

*Primary Examiner* — David M Sinclair
(74) *Attorney, Agent, or Firm* — Shapiro, Gabor and Rosenberger, PLLC

(57) ABSTRACT

A high voltage proof solid electrolytic capacitor that can prevent deterioration of voltage proof property due to lead-free reflow etc. and a manufacturing method thereof are provided. A capacitor element having an anode and cathode electrode foils wound via a separator is impregnated with a dispersion comprising conductive polymer particles or powder and a solvent to form a solid electrolyte layer consisting of a conductive polymer, and the voids inside the capacitor element having the solid electrolyte layer formed are filled with an ion-conducting substance comprising a mixed solvent comprising ethylene glycol and γ-butyrolactone together with a solute selected from at least one type of an ammonium salt, a quaternary ammonium salt, a quaternized amidinium salt, and an amine salt of an organic acid, an inorganic acid, and a composite compound between organic acid and inorganic acids to obtain a solid electrolytic capacitor.

4 Claims, No Drawings

SOLID ELECTROLYTIC CAPACITOR AND MANUFACTURING METHOD THEREOF

TECHNICAL FIELD

The present invention relates to a solid electrolytic capacitor and a manufacturing method thereof, in particular to a solid electrolytic capacitor that has good voltage proof property and a manufacturing method thereof.

BACKGROUND ART

An electrolytic capacitor that utilizes a metal having valve action such as tantalum or aluminum is generally widely employed, because compact size and large capacity can be obtained by making the valve action metal used as the anode side counter electrode into a form such as a sintered body or an etched foil to enlarge the surface of a dielectric. In particular, a solid electrolytic capacitor that employs a solid electrolyte as the electrolyte, by virtue of its compact size, large capacity, and low equivalent series resistance, as well as having characteristics such as good processability into chips and suitability for surface mounting, is crucial for allowing a more compact size, higher functionality, and lower cost of electronic instruments.

In this type of solid electrolytic capacitor, generally for application with compact size and large capacity, an anode and cathode foils consisting of a valve action metal such as aluminum are wound via a separator to form a capacitor element, this capacitor element is impregnated with the driving electrolytic solution, the capacitor element is housed in a housing made of a metal such as aluminum or a synthetic resin housing, and this has a sealed structure. Aluminum as well as tantalum, niobium, and titanium etc. are used as the anode material, and the same type of metal as the anode material is employed for the cathode material.

In addition, even though manganese dioxide or 7,7,8,8-tetracyanoguinodimethane (TCNQ) complex are known as the solid electrolyte employed for the solid electrolytic capacitor, a technology (Patent Document 1) exists in recent years that focuses on conductive polymers such as polyethylenedioxythiophene (hereinbelow shown as PEDOT) that has a moderate reaction rate and shows superior adhesion of the anode electrode with the oxide film layer.

Such type of solid electrolytic capacitor that forms a solid electrolyte layer consisting of a conductive polymer such as PEDOT on a wound-type capacitor element is fabricated as below. First, the surface of an anode foil consisting of a valve action metal such as aluminum is roughened by an electrochemical etching treatment in an aqueous chloride solution to form numerous etching pits, and then voltage is applied in an aqueous solution such as ammonium borate to form an oxide film layer that will become a dielectric (chemical conversion). Similarly to the anode foil, the cathode foil also consists of a valve action metal such as aluminum, but only an etching treatment is applied on its surface.

In this way, the anode foil having an oxide film layer formed on the surface and the cathode foil having only etching pits formed are wound via a separator to form a capacitor element. Subsequently, a polymerizable monomer such as 3,4-ethylenedioxythiophene (hereinbelow shown as EDOT) and an oxidant solution are each discharged to the capacitor element that was applied repair chemical conversion, or the capacitor element is immersed in a mixed solution of the two to promote a polymerization reaction inside the capacitor element, and a solid electrolyte layer consisting of the conductive polymer such as PEDOT is formed. This capacitor element is then housed in a closed-end tubular housing to fabricate a solid electrolytic capacitor.

RELATED TECHNICAL DOCUMENTS

Patent Documents

Patent Document 1: JP H2-15611 A

Meanwhile, solid electrolytic capacitors as described above have been employed for in-vehicle or general power circuits in recent years, and high voltage proof around 25 V or 63 V has come to be demanded. In order to be used for such applications, a solid electrolytic capacitor is desired that fulfills demand terms such as heat stability under high temperatures or charge and discharge performance under low temperatures, and even lower ESR.

Moreover, high melting point lead-free solders have been employed in recent years due to environmental problems, and the solder reflow temperature is shifting to even higher temperatures from 200 to 220° C., to 230 to 270° C. When performing solder reflow under such high temperatures, the voltage proof is reduced, and this is thought to be caused by heat deterioration or crystallization of the electrolyte layer. Such a problem similarly arose when not only EDOT was employed as the polymerizable monomer but when other thiophene derivatives, pyrroles, anilines, and the like were employed.

SUMMARY OF THE INVENTION

The present invention was proposed to solve the above problem, the object of which is to provide a high voltage proof solid electrolytic capacitor that can prevent deterioration of voltage proof property due to lead-free reflow etc. and a manufacturing method thereof.

Further, the object of the present invention is to provide a solid electrolytic capacitor that secures charge and discharge performance at low temperatures while reducing ESR and has long life at high temperatures, as well as a manufacturing method thereof.

As a result of various investigations by the present inventors to solve the above problem, the following conclusion was achieved.

Typically, in a capacitor element after forming a conductive polymer, monomers or oxidants that were not involved in the polymerization reaction and other reaction residues are present in addition to the conductive polymer. Since the voltage proof of substances other than these conductive polymers is lower than the voltage proof of the conductive polymer, these substances are thought to lower the voltage proof of the solid electrolytic capacitor. Accordingly, as the result of repeated investigations by the present inventors to avoid contamination of these reaction residues per se by impregnating with a dispersion comprising conductive polymer particles or powder and a solvent to form a solid electrolyte layer consisting of a conductive polymer, as well as to prevent deterioration of voltage proof property due to lead-free reflow, the present invention came to be completed.

In other words, the solid electrolytic capacitor of the present invention comprises a capacitor element including an anode electrode foil and a cathode electrode foil wound together with a separator therebetween; a solid is formed inside the capacitor element by impregnating the capacitor element with a dispersion including conductive polymer particles or powder and a solvent; and an ion-conducting substance filled in a void inside the capacitor element formed with the solid electrolyte layer, the ion-conducting substance comprises: a mixed solvent including ethylene glycol and γ-butyrolactone; and a solute selected from an ammonium salt, a quaternary ammonium salt, a quaternized amidinium salt, and an amine salt which are at least one type of an organic acid, an inorganic acid, and a composite compound of organic acid and inorganic acid.

A method for manufacturing a solid electrolytic capacitor as described above is also one of the present invention.

According to the present invention, deterioration of voltage proof property due to lead-free reflow etc. can be prevented. Moreover, according to the present invention, a solid electrolytic capacitor that has high voltage proof property and secures charge and discharge performance at low temperatures while having low ESR and having long life even at high temperatures can be provided.

DESCRIPTION OF EMBODIMENTS

Representative manufacturing process for manufacturing the solid electrolytic capacitor according to the present invention will now be disclosed below while further describing the present invention in detail.
(Method for Manufacturing Solid Electrolytic Capacitor)

An example of the method for manufacturing a solid electrolytic capacitor according to the present invention is as follows. Namely, an anode and cathode foils having an oxide film layer formed on the surface are wound via a separator to form a capacitor element, and a repair chemical conversion is applied to this capacitor element (first step). Subsequently, this capacitor element is impregnated with a dispersion comprising conductive polymer particles or powder and a solvent to form a solid electrolyte layer consisting of a conductive polymer (second step). This capacitor element is then immersed in a given ion-conducting substance in order to fill the voids inside the capacitor element with this ion-conducting substance (third step). Next, this capacitor element is inserted into a housing. A sealing rubber is mounted at the open end of the housing and sealed by caulking treatment. The capacitor element is then subjected to aging to form a solid electrolytic capacitor (fourth step).
(Chemical Conversion Solution for Repair Chemical Conversion in First Step)

A phosphoric acid-based chemical conversion solution such as ammonium dihydrogen phosphate and diammonium hydrogen phosphate, a boric acid-based chemical conversion solution such as ammonium borate, or an adipic acid-based chemical conversion solution such as adipic acid ammonium can be employed as the chemical conversion solution for the repair chemical conversion, among which ammonium dihydrogen phosphate is desirably employed. Moreover, the immersion time is desirably 5 to 120 minutes.
(Conductive Polymer Compound Dispersion in Second Step)

For the conductive polymer compound dispersion, a mixture of the solid content of a dopant consisting of PEDOT powder and polystyrene sulfonate is preferred. In addition, the solvent for the conductive polymer compound dispersion may be those that dissolve the conductive polymer compound particles or powder, and water is mainly employed. However, ethylene glycol may also be employed as necessary as the solvent for the dispersion. It has been revealed that when ethylene glycol is employed as the solvent for the dispersion, ESR can particularly be reduced among the electrical properties of the product. In order to improve the impregnating ability and electric conductivity of the conductive polymer compound dispersion, various additives may be added to the conductive polymer compound dispersion, or neutralization by addition of cations may be performed.
(Impregnation with Conductive Polymer Compound Dispersion)

The duration of impregnating the capacitor element with the conductive polymer compound dispersion is determined by the size of the capacitor element, desirably seconds or more for a capacitor element with approximately φ5×3 L and 10 seconds or more for a capacitor element with approximately φ9×5 L, and it is required to impregnate for at least 5 seconds. There is no adverse effect on property with extended impregnation. Moreover, after impregnation as such, it is preferred to retain a reduced pressure condition. The reason for this is thought to be that to reduce the residual amount of volatile solvents. The impregnation and drying of the conductive polymer compound dispersion may also be performed multiple times as necessary.
(Ion-Conducting Substance in Third Step)

As the ion-conducting substance to be filled inside the capacitor element after forming the solid electrolyte layer consisting of the conductive polymer inside the capacitor element, an electrolyte solution (electrolytic solution for electrolytic capacitor) that is ionically dissociated (has a disassociation constant) in an ordinary state can be employed. As solvents that can be used for the electrolyte solution, a solvent in which the boiling point thereof at the life test temperature is 120° C. or higher is preferably employed. Examples of a solvent can include γ-butyrolactone, ethylene glycol, sulfolane, dimethylformamide, and the like. In particular, when a mixed solvent consisting of ethylene glycol and γ-butyrolactone is employed, good initial ESR property is shown, and good high temperature property will also be shown.

In other words, as apparent from the Examples described below, it has been revealed that when a mixed solvent consisting of ethylene glycol and γ-butyrolactone is employed, compared to when a solvent that does not comprise ethylene glycol was employed, initial ESR will be reduced, and the rate of change in electrostatic capacitance (ΔCap) is small in extended use. The reason for this is thought to be that since ethylene glycol has an effect of promoting extension of the polymer chain of the conductive polymer, electric conductivity was improved and ESR was reduced. Moreover, since a protic solvent having a hydroxyl group such as ethylene glycol has higher affinity with the separator or the electrode foil and the conductive polymer than γ-butyrolactone or sulfolane, delivery of charge between the separator or the electrode foil and the conductive polymer and the electrolyte solution is easily performed in the process of electrolyte solution evaporation during the use of the electrolytic capacitor, and thus ΔCap will become small. Further, the amount of ethylene glycol added in the mixed solvent is preferably 10 to 80 wt %.

In addition, the impregnating ability of the electrolyte solution into the capacitor element can be improved by adding a given amount of γ-butyrolactone as the solvent for the electrolyte solution. By employing ethylene glycol having relatively high viscosity and γ-butyrolactone having low viscosity, the impregnating ability into the capacitor element is increased, good initial property and property in extended use is maintained, and good charge and discharge property at low temperatures will be shown. Since the vaporizability of the electrolytic solution will be increased and the expected property will become difficult to maintain if there is too much γ-butyrolactone in the mixed solvent, the amount of γ-butyrolactone added in the mixed solvent is preferably 10 to 60 wt %.

Moreover, at least one type of solvent selected from sulfolane, 3-methylsulfolane, and 2,4-dimethylsulfolane may be additively employed with a mixed solvent consisting of ion-conducting substances ethylene glycol and γ-butyrolactone. Since these sulfolane-based solvents have high boiling point, they can suppress the evaporation of the electrolyte solution and good high temperature property will be shown. The amount of these sulfolane-based solvents added in the mixed solvent is preferably 10 to 50 wt %.

The electrolyte solution can include a solution consisting of the above solvent together with a solute such as at least one type of an ammonium salt, a quaternary ammonium salt, a quaternized amidinium salt, and an amine salt of an organic acid, an inorganic acid, and a composite compound between organic acid and inorganic acids. The above organic acid includes carboxylic acids such as phthalic acid, isophthalic acid, terephthalic acid, maleic acid, adipic acid, benzoic acid, toluic acid, enanthic acid, malonic acid, 1,6-decanedicarboxylic acid, 1,7-octane dicarboxylic acid, and azelaic acid, as well as phenols. In addition, examples of an inorganic acid include boric acid, phosphoric acid, phosphorous acid, hypophosphorous acid, phosphate ester, carbonic acid, and silic acid. Examples of a composite compound of organic and inorganic acids include borodisalicylic acid, borodioxalic acid, and borodiglycolic acid.

Moreover, examples of the above at least one type of salt of an organic acid, an inorganic acid, and a composite compound of organic and inorganic acids include an ammonium salt include a quaternary ammonium salt, a quaternized amidinium salt, and an amine salt. Examples of a quaternary ammonium ion of a quaternary ammonium salt include tetramethylammonium, triethylmethylammonium, and tetraethylammonium. Examples of a quaternized amidinium include ethyldimethylimidazolinium and tetramethylimidazolinium. Amines of an amine salt include primary amines, secondary amines, and tertiary amines. Examples of a primary amine include methylamine, ethylamine, and propylamine, examples of a secondary amine include dimethylamine, diethylamine, ethylmethylamine, and dibutylamine, and examples of a tertiary amine include trimethylamine, triethylamine, tributylamine, and ethyldiisopropylamine.

Further, as apparent from the Examples described below, good ESR property at −40° C. will be shown when a borodisalicylic acid salt is used as the solute for the electrolyte solution. Moreover, examples of an additive for the electrolyte solution include a complex compound of polyoxyethylene glycol and boric acid and polysaccharides (such as mannite and sorbit), a complex compound of boric acid and polyvalent alcohol, nitro compounds (such as o-nitrobenzoic acid, m-nitrobenzoic acid, p-nitrobenzoic acid, o-nitrophenol, m-nitrophenol, and p-nitrophenol), and phosphate esters.

(Filling Condition of Ion-Conducting Substance)

When the ion-conducting substance as above is filled into the capacitor element, the amount to be filled is arbitrary as long as it can be filled in the voids inside the capacitor element, but is preferably 3 to 100% of the voids inside the capacitor element.

(Action/Effect)

As described above, after forming the conductive polymer inside the capacitor element, by immersing this capacitor element in a given ion-conducting substance, and filling the voids inside the capacitor element with this ion-conducting substance, deterioration of voltage proof property due to lead-free reflow can be prevented.

The reason for this is thought to be that in contrast to conventional methods, since a conventional polymerization reaction residue itself is not present in the capacitor element fabricated as above, reduction of voltage proof due to reaction residues having voltage proof lower than that of the conductive polymer can be suppressed, and voltage proof is improved as a result. Moreover, the reason that deterioration of voltage proof property due to lead-free reflow can be prevented is thought to be that since the above ion-conducting substance is thermally stable, the voltage proof improving effect described above will not be reduced even under lead-free reflow conditions.

Further, by comprising as an ion-conducting substance a mixed solvent comprising ethylene glycol and γ-butyrolactone together with a solute selected from at least one type of an ammonium salt, a quaternary ammonium salt, a quaternized amidinium salt, and an amine salt of an organic acid, an inorganic acid, and a composite compound between organic acid and inorganic acids, charge and discharge performance at low temperatures can be secured while enabling lower ESR and long life under high temperatures to be achieved.

EXAMPLES

The present invention will now be further described in detail based on Examples and Comparative Examples manufactured as below.

First, electrode leads were connected to an anode and cathode foils having an oxide film layer formed on the surface, both electrode foils were wound via a separator to form a capacitor element having an element form of 6.34φ× 6.1 L. Next, this capacitor element was immersed in an aqueous ammonium dihydrogen phosphate solution for 40 minutes to allow repair chemical conversion. This was then immersed in a conductive polymer compound dispersion of fine particles of PEDOT and polystyrene sulfonate dispersed in the aqueous solution, and the capacitor element was pulled out and dried at about 150° C. Immersion in the conductive polymer compound dispersion/drying of this capacitor element was further repeated multiple times to form a conductive polymer layer consisting of a conductive polymer on the capacitor element. This capacitor element was then filled with electrolyte solutions shown in Table 1. Next, this capacitor element was inserted into a closed-end tubular housing. A sealing rubber was mounted at the open end of the housing and was sealed by caulking treatment. Subsequently, aging was performed by voltage application, and a solid electrolytic capacitor was formed. The rated voltage of this solid electrolytic capacitor is 35 WV, and the rated capacity is 27 μF.

TABLE 1

| | Composition of Electrolyte Solution (Parts) | | | | | | | | | | | | |
|---|---|---|---|---|---|---|---|---|---|---|---|---|---|
| | EG | GBL | TMS | 3MSN | PEG | PhA | BSalA | AzA | BeA | TEA | TMA | EDMI | NH$_3$ |
| Comparative Example 1 | 0 | 100 | 0 | 0 | 0 | 4 | 0 | 0 | 0 | 2.44 | 0 | 0 | 0 |
| Comparative Example 2 | 0 | 40 | 60 | 0 | 0 | 0 | 7.44 | 0 | 0 | 0 | 1.56 | 0 | 0 |
| Example 1 | 60 | 40 | 0 | 0 | 0 | 4 | 0 | 0 | 0 | 2.44 | 0 | 0 | 0 |
| Example 2 | 60 | 40 | 0 | 0 | 0 | 0 | 7.44 | 0 | 0 | 0 | 1.56 | 0 | 0 |
| Example 3 | 60 | 40 | 0 | 0 | 0 | 0 | 0 | 4.5 | 0 | 2.42 | 0 | 0 | 0 |
| Example 4 | 60 | 40 | 0 | 0 | 20 | 0 | 7.44 | 0 | 0 | 0 | 1.56 | 0 | 0 |
| Example 5 | 60 | 40 | 0 | 0 | 0 | 0 | 0 | 0 | 10.5 | 0 | 0 | 0 | 1.47 |
| Example 6 | 20 | 40 | 40 | 0 | 0 | 14.1 | 0 | 0 | 0 | 0 | 0 | 10.9 | 0 |
| Example 7 | 20 | 40 | 0 | 40 | 0 | 0 | 7.44 | 0 | 0 | 0 | 1.56 | 0 | 0 |

EG: Ethylene glycol
GBL: γ-Butyrolactone
TMS: Sulfolane
3MSN: 3-Methylsulfolane
PEG: Polyoxyethylene glycol
PhA: Phthalic acid
BSalA: Borodisalicylic acid
AzA: Azelaic acid
BeA: Benzoic acid
TEA: Triethylamine
TMA: Trimethylamine
EDMI: 1-Ethyl-2,3-dimethylimidazolinium
NH$_3$: Ammonia The initial ESR property as well as the results of ESR property, amount of electrolyte solution lost, and ΔCap when a 125° C., 1500-hour no-load shelf test was performed on the solid electrolytic capacitors fabricated in Table 1 are shown in Table 2. All ESR properties herein show values at 100 kHz (20° C.). Moreover, the amount of the electrolyte solution lost is measured by the difference between the initial product weight and the product weight after the above shelf test.

TABLE 2

| | | 125° C., 1500 h No-load Shelf Test | |
|---|---|---|---|
| | Initial ESR [mΩ] | ESR [mΩ] | Amount of Electrolyte Solution Lost [mg] | ΔCap [%] |
| Comparative Example 1 | 35 | 75 | −28.0 | −25.0 |
| Comparative Example 2 | 33 | 62 | −14.2 | −10.8 |
| Example 1 | 25 | 42 | −14.3 | −5.0 |
| Example 2 | 24 | 33 | −14.1 | −5.3 |
| Example 3 | 25 | 43 | −14.2 | −5.1 |
| Example 4 | 28 | 39 | −14.1 | −4.0 |
| Example 5 | 27 | 45 | −13.9 | −5.2 |
| Example 6 | 29 | 57 | −14.1 | −7.5 |
| Example 7 | 28 | 56 | −14.1 | −7.5 |

From the results of Table 2, by comparing Comparative Example 1 with Example 1 or Comparative Example 2 with Example 2, it was found that Examples 1 and 2 that employed a mixed solvent of ethylene glycol and γ-butyrolactone had low initial ESR, and further, deterioration of the property was small after a high temperature test. As shown in Examples 3 to 7, it was found that similar effects could also be obtained by changing the anion or cation components of the solute and adding polyoxyethylene glycol as an additive.

The low temperature charge and discharge property (100000 cycles, −40° C.) of the solid electrolytic capacitors of Examples 1 and 2 were performed, and the ESR property was measured. The results were 50 mΩ for Example 1 and 37 mΩ for Example 2. From this, it was found that low temperature property was good by employing a borodisalicylic acid salt as the solute. As for deterioration at low temperatures, current crowding is caused in the conductive polymer by the electric conductivity downturn due to coagulation or a viscosity rise of the electrolyte solution at low temperatures, thereby causing hyperoxidation of the conductive polymer and a rise in ESR. It is thought that since the oxidation potential of borodisalicylic acid employed in Example 2 is nobler than the oxidation potential of the conductive polymer, this acts as an antioxidant, thereby suppressing the oxidation of the conductive polymer.

The composition of the electrolyte solutions when the amounts of ethylene glycol and γ-butyrolactone added were altered, the initial ESR property, as well as the ESR property, ΔCap, and low temperature charge and discharge property (100000 cycles, −40° C.) after a 125° C., 1500-hour no-load shelf test are shown in Table 3.

TABLE 3

| | Composition of Electrolyte Solution (Parts) | | | | | Initial ESR [mΩ] | 125° C., 1500 h No-load Shelf Test | | ESR Property −40° C. [mΩ] |
|---|---|---|---|---|---|---|---|---|---|
| | EG | GBL | TMS | BSalA | TMA | | ESR [mΩ] | ΔCap [%] | |
| Comparative Example 1 | 0 | 100 | 0 | 7.44 | 1.56 | 35 | 75 | −25.0 | 42 |
| Example 8 | 5 | 90 | 5 | 7.44 | 1.56 | 32 | 70 | −22.0 | 42 |
| Example 9 | 5 | 40 | 55 | 7.44 | 1.56 | 32 | 61 | −10.0 | 43 |

TABLE 3-continued

| | Composition of Electrolyte Solution (Parts) | | | | | Initial | 125° C., 1500 h No-load Shelf Test | | ESR Property −40° |
|---|---|---|---|---|---|---|---|---|---|
| | EG | GBL | TMS | BSalA | TMA | ESR [mΩ] | ESR[mΩ] | ΔCap[%] | C.[mΩ] |
| Example 10 | 10 | 60 | 30 | 7.44 | 1.56 | 29 | 58 | −12.0 | 43 |
| Example 11 | 10 | 40 | 50 | 7.44 | 1.56 | 29 | 57 | −8.8 | 44 |
| Example 12 | 20 | 40 | 40 | 7.44 | 1.56 | 27 | 54 | −7.4 | 47 |
| Example 13 | 40 | 40 | 20 | 7.44 | 1.56 | 25 | 50 | −6.3 | 48 |
| Example 2 | 60 | 40 | 0 | 7.44 | 1.56 | 24 | 33 | −5.3 | 37 |
| Example 14 | 80 | 20 | 0 | 7.44 | 1.56 | 23 | 32 | −4.9 | 59 |
| Example 15 | 90 | 5 | 5 | 7.44 | 1.56 | 22 | 31 | −4.7 | 102 |

From the results of Table 3, it was found that good initial ESR property and good capacitor property at high temperatures will be shown by increasing the amount of ethylene glycol added. However, in Example 15 where the amount of ethylene glycol added was 90 wt %, the result showed a rise in low temperature charge and discharge property. Moreover, it was found that good initial ESR property and good capacitor property at high temperatures will be shown in Example 10 where the amount of γ-butyrolactone added was 60 wt % compared to Comparative Example 1 where the amount of γ-butyrolactone added was 100 wt % or Example 8 where it was 90 wt %.

Next, 10% of ethylene glycol was added to the dispersion of fine particles of PEDOT and polystyrene sulfonate dispersed in an aqueous solution to prepare a conductive polymer compound dispersion, and a solid electrolytic capacitor was fabricated using the same composition as Example 2 as the electrolyte solution (Example 16). The initial ESR property, as well as the ESR property and ΔCap after a 125° C., 1500-hour no-load shelf test for this solid electrolytic capacitor are shown in

TABLE 4

| | Initial ESR | 125° C., 1500 h No-load Shelf Test | |
|---|---|---|---|
| | [mΩ] | EXR [mΩ] | ΔCap [%] |
| Example 2 | 24 | 33 | −5.3 |
| Example 16 | 16 | 24 | −5.2 |

From the results of Table 4, it was found that initial ESR will be reduced by adding ethylene glycol to the conductive polymer compound dispersion. ESR property is also good even after a high temperature no-load shelf test.

Next, the electrode foils and the aging conditions of Comparative Example 2 and Example 2 were altered to fabricate solid electrolytic capacitors, and each was referred to as Comparative Example 3 and Example 17. In addition, a solid electrolytic capacitor was fabricated similarly to Example 17 except that an ion-conducting substance was not filled, and this was referred to as Conventional Example 1. The rated voltage of these solid electrolytic capacitors is 63 WV, 33 μF.

The voltage proof properties of the solid electrolytic capacitors fabricated as above were verified. Table 5 shows the voltage proof increase rate before reflow and the voltage proof decrease rate after reflow for Conventional Example 1, Comparative Example 3, and Example 17. The voltage proof increase rate before reflow indicates the voltage proof increase rate for Comparative Example 3 and Example 17, with the voltage proof before reflow for Conventional Example 1 as the baseline. On the other hand, the voltage proof decrease rate after reflow indicates the decrease rate of voltage proof due to performing reflow, with the voltage proof before reflow for each solid electrolytic capacitor as the baseline. The reflow peak temperature was set at 260° C.

TABLE 5

| | Voltage Proof Increase Rate Before Reflow (%) | Voltage Proof Decrease Rate After Reflow (%) |
|---|---|---|
| Conventional Example 1 | 0 | 10 |
| Comparative Example 3 | 5 | 4 |
| Example 17 | 11 | 0.8 |

As described in Table 5, it was found that the voltage proof increase rate before reflow for Comparative Example 3 in relation to Conventional Example 1 was 5%, whereas it was largely increased to 11% for Example 17. In addition, the voltage proof decrease rate after reflow for Conventional Example 1 and Comparative Example 3 largely dropped to 10% and 4% each, showing deterioration, while Example 17 was maintained almost unchanged at less than 1%. From this result, it was found that the solid electrolytic capacitor of the present invention has high voltage proof property, and can prevent deterioration of voltage proof property even when the reflow temperature is high.

The invention claimed is:
1. A solid electrolytic capacitor comprising:
   a capacitor element including an anode electrode foil and a cathode electrode foil wound together with a separator therebetween;
   a solid electrolyte layer consisting of a conductive polymer that is formed inside the capacitor element by impregnating the capacitor element with a dispersion including conductive polymer particles or powder and a solvent; and
   an ion-conducting substance filled in a void inside the capacitor element formed with the solid electrolyte layer, the ion-conducting substance comprising: a mixed solvent including ethylene glycol and γ-butyrolactone; and a solute which is a salt of borodisalicylic acid, the salt being selected from an ammonium salt, a quaternary ammonium salt, a quaternized amidinium salt, and an amine salt,
   wherein the ethylene glycol is added at 10 to 60 wt % of the mixed solvent, and the γ-butyrolactone is added at 40 wt % or less of the mixed solvent.
2. The solid electrolytic capacitor according to claim 1, wherein the mixed solvent of the ion-conducting substance contains an ion-conducting substance comprising at least one type of solvent selected from sulfolane, 3-methylsulfolane, and 2,4-dimethylsulfolane.

3. The solid electrolytic capacitor according to claim 2, wherein the solvent of the dispersion includes ethylene glycol.

4. The solid electrolytic capacitor according to claim 1, wherein the solvent of the dispersion includes ethylene glycol.

* * * * *